United States Patent [19]

Tessler

[11] 3,720,663
[45] March 13, 1973

[54] PREPARATION OF STARCH ESTERS
[75] Inventor: Martin M. Tessler, Edison, N.J.
[73] Assignee: National Starch and Chemical Corporation, New York, N.Y.
[22] Filed: June 24, 1971
[21] Appl. No.: 156,524

[52] U.S. Cl..........260/233.5, 117/139.5 C, 117/148, 260/233.3 A, 260/233.3 R
[51] Int. Cl. ..............................................C08b 19/02
[58] Field of Search .....260/233.3 A, 233.3 R, 233.5, 260/213, 214

[56] References Cited

UNITED STATES PATENTS

| | | | |
|---|---|---|---|
| 2,868,781 | 1/1959 | Gaertner et al. | 260/234 |
| 3,038,895 | 6/1962 | Rutenberg et al. | 260/233.3 |
| 3,281,411 | 10/1966 | Lemmerling | 260/233.5 |
| 3,376,287 | 4/1968 | Jardwenko et al. | 260/233.5 |
| 3,553,196 | 1/1971 | Mark et al. | 260/233.5 |

OTHER PUBLICATIONS

Whistler et al., ed. "Methods in Carbohydrate Chemistry," Vol. IV, pp. 286–288, Academic Press, N.Y. 1964.
Whistler et al., "Journal of Organic Chemistry," Vol. 26, pp. 4600–4605, Nov. 1961.

*Primary Examiner*—Donald E. Czaja
*Assistant Examiner*—Melvyn I. Marquis
*Attorney*—Axwell James et al.

[57] ABSTRACT

Aqueous slurries or dispersions of starch are reacted with imadazolides of carboxylic or sulfonic acids to yield starch ester derivatives. These starch products can also be prepared in non-aqueous solvents or by a dry reaction process.

9 Claims, No Drawings

PREPARATION OF STARCH ESTERS

This invention relates to a novel method for the preparation of starch esters and to the resulting starch ester derivatives and more particularly to the preparation of such esters by reacting starch with imidazolides of carboxylic or sulfonic acids.

The modification of starch by chemical derivatization and in particular the preparation of starch esters is well known in the art. An excellent review of the preparation of starch esters up to 1968 may be found in J. A. Radley, *Starch and Its Derivatives*, Chapman and Hall, Ltd., Chapter 12. However, the prior art does not teach the preparation of starch derivatives by reaction of starch with imidazolides of carboxylic or sulfonic acids.

The reactions of imidazolides of carboxylic acids with hydroxy compounds are known and are described, for example, in H. A. Staab, *Angew. Chem. Internat. Edit.*, 1, 351(1962); H. A. Staab and A. Mannschreck, *Ber.*, 95, 1284(1962); and W. Klee and M. Breener, *Helv. Chim. Acta*, 44, 2151(1961). These references, however, all teach the acylation of alcohols with imidazolides of carboxylic acids under anhydrous conditions using organic solvents. I have now discovered that it is unnecessary to use anhydrous conditions and an organic medium, but that water is actually a very good medium for reacting starch with imidazolides of carboxylic acids.

It is an object of this invention to provide a novel method for the preparation of inhibited starch products containing labile ester linkages so as to permit these linkages to be subsequently controllably and readily destroyed or eliminated, and whose presence permits these products to exhibit a combination of inhibited and normal swelling characteristics.

Another object of this invention is to prepare inhibited starch products that are free of the undesired effects of non-cross-linked substitution onto starch, as for example, acetylation.

A further object of this invention is to provide a convenient and economical new reaction for chemically altering the paste properties of starch by a reaction which proceeds rapidly with aqueous slurries or with dispersions of starch in water at room temperature.

Various other objects and advantages of this invention will be apparent from the following description.

The objects of this invention are accomplished by reacting starch with imidazolides of carboxylic or sulfonic acids.

According to this invention starch or a starch derivative is reacted with an imidazolide of a carboxylic or sulfonic acid in aqueous or non-aqueous solution or in the dry state to produce a starch ester derivative. If imidazolides of polyfunctional acids are used, cross-linked starch esters may be produced. The reaction may be carried out at temperatures ranging from somewhat below to somewhat above room temperature. By a suitable choice of starting materials, reagents, and reaction conditions, very useful modified starches may be prepared easily and conveniently as will be explained more fully hereinafter.

The starch base materials which may be used in preparing starch ester products according to this invention may be derived from any plant source including corn, potato, sweet potato, wheat, rice, sago, tapioca, waxy maize, sorghum, high amylose corn, or the like. Also included are the conversion products derived from any of the above starch bases including, for example, dextrins prepared by the hydrolytic action of acid and/or heat; oxidized starches prepared by treatment with oxidants such as sodium hypochlorite; and fluidity or thin boiling starches prepared by enzyme conversion or by mild acid hydrolysis. The term "starch base" is thus seen to include any amylaceous substances, whether untreated or chemically modified, which, however, still retain free hydroxyl groups capable of entering into the acylation reaction. If the desired product is to be a granular starch obviously the initial starting material must be in granular form. It is to be noted that the process of this invention may also be carried out employing gelatinized starches which will result in the production of non-granular starch ester products.

For purposes of this invention the term "imidazolides of carboxylic or sulfonic acids" means compounds corresponding to the general formulas:

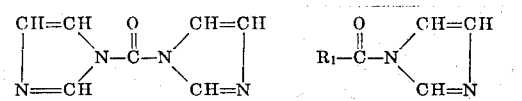

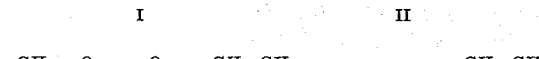

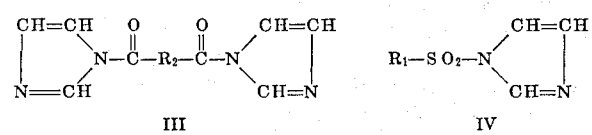

Where in $R_1$ is selected from the group consisting of alkyl, substituted alkyl, unsaturated alkyl, cycloalkyl, aryl, substituted aryl, and arylalkyl, and $R_2$ is selected from the group consisting of alkylene, substituted alkylene, bis-alkylene ether, cycloalkylene, arylene, and substituted arylene. $R_1$ and $R_2$ may each contain between one and 20 carbon atoms.

It is to be noted that additional compounds analogous to the compounds of structure III but having more than two carboxyl groups attached to $R_2$ may also be used to prepare inhibited starches according to this invention.

Suitable imidazolides of carboxylic or sulfonic acids corresponding to structures II – IV may be prepared using acids such, for example, as acetic acid, propionic acid, stearic acid, trimethylacetic acid, phenylacetic acid, benzoic acid, cinnamic acid, trichloroacetic acid, p-bromobenzoic acid, p-methoxybenzoic acid, p-toluic acid, p-dimethylaminobenzoic acid, succinic acid, glutaric acid, adipic acid, dimethylmalonic acid, sebacic acid, 1,22-docosanedioic acid, terephthalic acid, diglycolic acid, 3,3'-oxydipropionic acid, benzenesulfonic acid, p-toluenesulfonic acid, methanesulfonic acid, p-aminobenzenesulfonic acid, 1-napthoic acid, and cyclohexane-carboxylic acid.

The preparation of imidazolides of carboxylic and sulfonic acids is well described in the literature and is ordinarily carried out by reacting selected sulfonic or carboxylic acids such as those listed above with 1,1'-carbonyldiimidazole or 1,1'-thionyldiimidazole. An alternative synthesis reacts the acid chlorides of the carboxylic or sulfonic acids with imidazole. A discussion of synthetic procedures and a tabulation of various imidazolides and references to their preparation may be found in H.A. Staab, *Angew. Chem. Internat. Edit.*, 1, 351 (1962).

The novel process of this invention comprises reacting a selected imidazolide of a carboxylic acid, such as described hereinabove, with a selected starch base which is ordinarily suspended in water. The reaction of the imidazolides with the suspended starch is carried out at temperatures ranging from about 35° to 125° F. and preferably at 70° to 100° F. The pH of the reaction mixture is ordinarily controlled so as to be above 4.0 and below 11.0 with the preferred range being from about 6.0 to about 10.0. The pH is conveniently controlled by the periodic addition of a dilute aqueous solution of sodium hydroxide, but other common bases, such as calcium or potassium hydroxide, tetramethylammonium hydroxide and sodium carbonate, may also be used with equal success.

In one variation of the described method, the pH of the reaction mixture is not controlled. In this variation an excess of base is added to the system, which results in a pH in the range of 11.0–12.5, with the imidazolide being added and the reaction mixture neutralized thereafter.

Aqueous suspensions are preferred, but the reaction may be carried out, if desired, in a non-aqueous system by suspending the starch base in any common organic solvent as, for example, p-dioxane, toluene, dichloromethane, and the like, and then adding the imidazolide.

The amount of imidazolide reagent used to react with the starch base may vary from about 0.05 to 100 percent, based on the dry weight of the starch, depending on such factors as the starch base employed, the degree of stabilization or inhibition which is desired in the end product, and the particular imidazolide reagent.

Reaction time will vary from about 1.0 hour to about 24 hours depending on such factors as the reactivity of the reagent used, the amount of the reagent used, the temperature employed, etc. After completion of the reaction, the pH of the reaction mixture is preferably adjusted to a pH of from about 5.0 to about 7.0 with any common acid such as hydrochloric acid, sulfuric acid, acetic acid, or the like, or common base such as 3.0 percent aqueous sodium hydroxide. The pH of the reaction will determine whether acid or base is required. The resultant starch product is then recovered by filtration, washed free of residual salts with water, and dried. Alternatively the washed product may be drum dried or spray dried, or gelatinized and isolated by alcohol precipitation.

If desired, the acylated starch products may be also prepared according to this invention by a dry process. In carrying out a typical dry procedure, the dry starch is first suspended in water and the slurry is adjusted to a pH of about 7.0 to about 11.8. The starch is thereafter dried, using any common means desired by the practitioner. The imidazolide is then blended with the dry starch base and the resulting mixture thereafter heated (as by placing in an oven) at temperatures ranging from about 80° to about 160°F. The reaction period (i.e., the heating time) will vary with such factors as the reactivity of the selected imidazolide, the selected starch base, etc. Reaction periods ranging from about 30 minutes to 6 hours have been found sufficient in most instances, however. At the end of the reaction period, the treated starch is allowed to cool. If removal of the salts and organic by-products is desired, the starch is then slurried in water. The pH of the slurry is adjusted to from 5.0 to 7.0, and the starch product is recovered from the slurry by filtration, washed free of residual salts with water, and isolated in a manner such as described above.

It is to be noted that a large number of variations may be effected in reacting the starch base with imidazolides in accordance with either the wet or dry reaction procedure described above without materially departing from the spirit of the invention. Such variations will be evident to those skilled in the art.

The starch products resulting from the practice of this invention are starch esters with the general reactions employing imidazolides I, II, III, and IV being represented as follows:

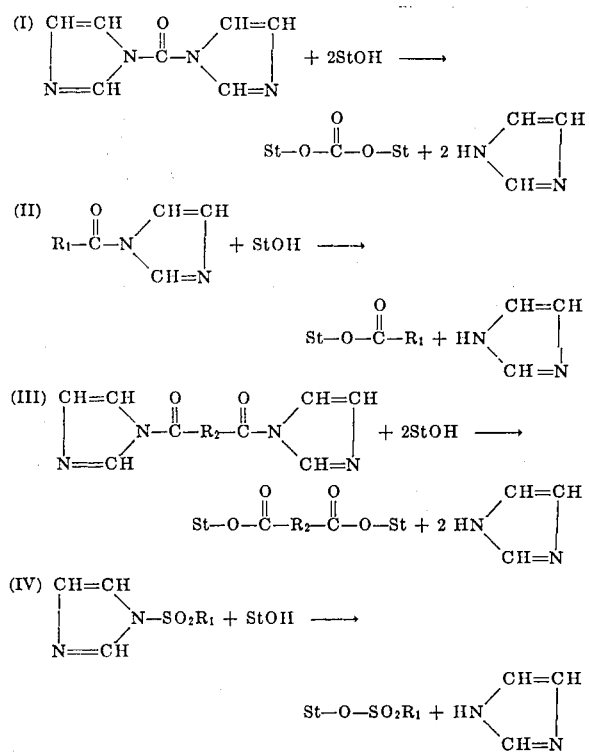

wherein StOH represents the starch molecule and $R_1$ and $R_2$ are as defined hereinabove. These are schematic equations which describe the chemical changes occurring during the reaction. The practitioner will recognize that the starch molecule is a polymer of glucose and contains three free hydroxyl groups per anhydroglucose unit in the polymer. (The non-reducing end glucose units contain four free hydroxyl groups.) Each of these hydroxyl groups can react as described in these equations. It is also known that the relative reactivity of each of the hydroxyl groups is not equivalent, some being more reactive than others, and that many hydroxyl groups from the same starch molecule will react to give the products of this invention.

The inhibited, granular products formed in equations (I) and (III) may show varying degrees of inhibition depending on the extent of the reaction and the consequent number of resulting crosslinkages. The amount of granule inhibition may be determined by performing a sediment volume test. In this procedure, an aqueous suspension of the inhibited product having a concentration of 1 percent solids, by weight, is cooked on a boiling water bath for about 30 minutes. The resulting dispersion is then allowed to stand in a graduated vessel, such as a 100 ml graduated cylinder, at room temperature for a period of about 16 hours. The cooked product will separate into layers on the basis of relative inhibition. In extreme cases it will completely settle out with the sediment so formed occupying different volumes depending on the degree of inhibition of the reaction product. These sediments are composed of insoluble granules of the starch derivative whose swollen volumes are relative to the degree of inhibition of the derivatives. Thus, because of their lower swelling and hydration capacity, the more inhibited, i.e., the more crosslinked products will yield smaller sediment volumes than correspondingly less inhibited products. Where, however, the original starch base exhibits no sediment formation because of the completely swollen, highly hydrated and/or disrupted nature of its granules, e.g., in the case of waxy maize starch, inhibition in the product will be evidenced by the subsequent formation of sediment. The result is directly attributable to the toughened state of the cross-linked granules.

The cross-linked products of this invention, because of their unique combination of properties, can be utilized in many applications. Thus, in the food industry, they can be used as thickening agents for pies, sauces, soups, etc. They are particularly of interest in the canning industry as a result of their unique behavior during retorting of the canned food products. In the retorting process the crosslinkages of the inhibited starch products of this invention are initially intact and the starch dispersion is in a thin state, thereby enabling the heat utilized for sterilizing the food product to penetrate the can and its contents rapidly. As the heating is continued, however, the crosslinkages of the inhibited starch thickeners are destroyed thereby activating their delayed thickening properties to produce desirable high viscosity dispersions. The cross-linked products of this invention may also be used in various sizing, coating, and adhesive applications. In addition, these novel starch products may be used as dusting powders for surgical and cosmetic purposes, etc.

The stabilized cereal starch ester products of the invention formed in equations (II) and (IV) are characterized by the stability of their dispersions. Thus the cooked pastes derived from the water dispersible form of these esters display improved clarity and resistance to gelling on cooling. This highly desired property permits these derivatives of this invention to be widely utilized as, for example, in the sizing of paper and textiles, and in foods. Another characteristic of the starch products of this invention is lowered gelatinization temperature as compared to untreated starch. This is of importance in many industrial processes (particularly in food manufacture), since it permits operation at lower temperatures.

The following examples will illustrate the practice of this invention but are not intended to limit its scope. In these examples, all parts given are by weight unless otherwise noted.

EXAMPLE I

This example illustrates the use of various imidazolides of carboxylic and sulfonic acids in preparing starch esters according to the process of this invention by means of milk reactions wherein the resulting products are not inhibited and display an intact granule structure.

In preparing the starch derivatives, listed in Table I, 1.00 parts of corn starch were suspended in 1.25 parts of water, whereupon the indicated amounts of the selected imidazolide of a carboxylic or sulfonic acid were added to the dispersion. The pH was controlled at the indicated value by periodic addition of 3.0 percent aqueous sodium hydroxide solution during the course of the reaction. The reaction was allowed to proceed at room temperature (RT) until there was no further change in pH. The resulting starch ester derivatives were then acidified with dilute sulfuric acid, recovered by filtration, and subsequently washed with water to remove residual salts. The acyl content of each of the reacted starches calculated from the saponification number, was determined and is listed in Table I.

TABLE I

| Derivative Number | Esterification Reagent Name | % on Starch | Reaction conditions controlled pH | Time Hours | % Acyl |
|---|---|---|---|---|---|
| 1 | N-acetylimidazole | 6.0 | 8.0 | 2.0 | 1.57 |
| 2 | N-benzoylimidazole | 7.0 | 8.0 | 2.0 | 3.29 |
| 3 | N-benzoylimidazole | 7.0 | 9.0 | 2.0 | 3.08 |
| 4 | N-acryloylimidazole | 7.0 | 8.0 | 1.75 | 0.48 |
| 5 | N-methanesulfonylimidazole | 10.0 | 8.0 | 16.0 | 0.53 |
| 6 | N-(p-toluenesulfonyl) imidazole | 7.0 | 10.0 | 8.0 | 2.18 |
| 7 | N-stearylimidazole | 20.0 | 9.0 | 18.0 | 4.43 |

EXAMPLE II

This example illustrates the use of 1,1'-carbonyldiimidazole in preparing inhibited starch esters by the milk reactions of this invention.

In preparing these derivatives, listed in Table II, 1.00 part of the respective starch bases was suspended in 1.25 to 1.50 parts of water whereupon the indicated amounts of 1,1'-carbonyldiimidazole were added to suspension. The pH was controlled at the indicated value by periodic addition of 3.0 percent aqueous sodium hydroxide solution during the course of the reaction. The reaction was allowed to proceed, with agitation, at the desired temperature until there was no further change in pH. Most of the reactions were completed in about 1 hour. The resulting starch ester derivatives were then acidified with dilute sulfuric acid, recovered by filtration, and washed with water to remove residual salts.

The degree of inhibition was determined by cooking an aqueous suspension of the resulting starch product having a concentration of 1 percent, by weight, solids in a boiling water bath for a period of 30 minutes.

TABLE II

| Derivative Number | Starch base | Parts by wt. 1,1'-carbonyldiimidazole per 100 parts starch | Reaction conditions | | Sediment volume (ml.) | |
|---|---|---|---|---|---|---|
| | | | Controlled pH | Reaction temp. (°C.) | Reaction product | Base |
| 10 | Corn starch | 1.5 | 8.0 | RT | 13.0 | 62.0. |
| 11 | Waxy maize (acid converted to a degree known in the trade, as 85 fluidity). | 1.5 | 8.0 | RT | 29.0 | None. |
| 12 | Oxidized corn starch (converted by reaction with NaOCl to a degree known, in the trade, as 75 fluidity). | 1.5 | 8.0 | RT | 16.0 | Do. |
| 13 | Corn starch which was previously hydroxypropylated with 5% propylene oxide. | 1.5 | 8.0 | RT | 23.0 | 91.0. |
| 14 | Potato starch | 1.5 | 8.0 | RT | 21.0 | 75.0. |
| 15 | Waxy maize | 1.5 | 4.0 | RT | 56.0 | None. |
| 16 | do | 1.5 | 5.0 | RT | 33.0 | Do. |
| 17 | do | 1.5 | 6.0 | RT | 18.5 | Do. |
| 18 | do | 1.5 | 7.0 | RT | 19.2 | Do. |
| 19 | do | 1.5 | 8.0 | RT | 24.5 | Do. |
| 20 | do | 1.5 | 9.0 | RT | 23.5 | Do. |
| 21 | do | 1.5 | 10.0 | RT | 45.0 | Do. |
| 22 | do | 1.5 | 8.0 | 2–3 | 15.5 | Do. |
| 23 | do | 1.5 | 7.5 | 48 | 63.0 | Do. |
| 24 | do | 75.0 | 8.0 | RT | 8.0 | Do. |
| 25 | do | 0.1 | 8.0 | RT | 40.5 | Do. |
| 26 | do | 0.2 | 8.0 | RT | 35.0 | Do. |

The cooked dispersion was then allowed to stand at room temperature in a 100 ml graduated cylinder for a period of approximately 16 hours. In order to show comparative values, the sediment volume of the base starch was also determined by this method.

EXAMPLE III

This example illustrates the use of imidazolides of polycarboxylic acids in preparing inhibited starches by means of milk reactions according to this invention.

The procedure of Example II was used to prepare the starch derivatives listed in Table III, using in each case the listed reagent in place of the 1,1'-carbonyldiimidazolide of that example. The starch base in each case was waxy maize.

TABLE III

| Derivative Number | Esterification reagent Imidazolide of— | Percent on starch | Reaction conditions | | | Sediment volume (ml.) | |
|---|---|---|---|---|---|---|---|
| | | | Controlled pH | Time, hours | Temp., °C. | Reaction product | Base |
| 30 | Succinic acid | 2.0 | 8.0 | 1.0 | RT | 12.0 | None. |
| 31 | 1,22-docosanedioic acid | 2.0 | 8.0 | 2.0 | RT | 49.0 | Do. |
| 32 | Adipic acid | 10.0 | 8.0 | 18.0 | RT | 5.0 | Do. |
| 33 | 1,3,5-pentanetricarboxylic acid | 10.0 | 8.0 | 17.0 | RT | 5.0 | Do. |
| 34 | 1,3,5-benzenetricarboxylic acid | 10.0 | 8.0 | 16.0 | RT | 6.0 | Do. |

EXAMPLE IV

This example illustrates the preparation of inhibited starch products according to this invention utilizing a non-aqueous solvent system.

A total of 20 parts of waxy maize was suspended in 60 parts of dichloromethane. The starch suspension was stirred at room temperature while 1.0 part of 1,1'-carbonyldiimidazole was added slowly over a 10 minute period. After the addition was complete, the starch suspension was stirred for 1 hour and recovered by filtration. The product was then washed with water and dried. The starch carbonate ester product had a sediment volume of 31.0 ml while the base starch had no sediment. This indicates that inhibition had occurred.

EXAMPLE V

This example illustrates the preparation of a non-granular, cross-linked starch product prepared by using a previously gelatinized starch base in the process of this invention.

A total of 20 parts of an acid hydrolyzed waxy maize (85 fluidity) was suspended in 80 parts of water. The suspension was heated on a boiling water bath for 20 minutes and then cooled to about room temperature, and the pH of the thus-gelatinized starch was adjusted to 8.0 with dilute sodium hydroxide. Thereafter, the cooled starch dispersion was stirred and 1.0 parts of 1,1'-carbonyldiimidazole was added over a period of 10 minutes. A pH of 8.0 was maintained during the entire reaction. The reaction mixture exhibited a significant increase in viscosity and formed a gel after 45 minutes. This indicated that cross-linking had occurred.

EXAMPLE VI

This example illustrates the preparation of starch ester products according to this invention in the presence of excess alkali.

A total of 40 parts of corn starch was added to a solution of 1.2 parts sodium hydroxide and 12.0 parts of sodium sulfate in 50 parts of water. The starch suspension was stirred at room temperature while 3.0 parts of N-(p-toluenesulfonyl) imidazole was rapidly added. After stirring for an additional 3 hours, the pH was lowered from 12.1 to 5.0 with 6 N sulfuric acid and the starch was isolated by filtration. The starch product was washed three times with water and air dried. The starch product was found to contain 3.72 percent p-toluenesulfonyl groups.

EXAMPLE VII

This example illustrates the preparation of a starch ester product according to this invention by means of a dry reaction.

A total of 30 parts of corn starch was pretreated by suspending the starch in 37.5 parts of water, adjusting the pH to 8.0 with 3.0 percent sodium hydroxide, and stirring at room temperature for 15 minutes. The suspension was thereafter filtered and the recovered starch was air dried to a moisture content of 17.4 percent. To 15 parts of the pretreated starch were added 1.5 parts of N-acetylimidazole and the mixture was then placed in an oven at a temperature of 50° C. for a period of 3 hours. The starch was then cooled and poured into 20 parts of water. The pH of this suspension was adjusted to 5.0 with dilute sulfuric acid, and the starch was recovered by filtration, washed three times with water, and air dried. The starch ester product contained 2.06 percent acetyl groups.

In summary, this invention provides a novel and improved process for making starch esters and novel starch ester derivatives obtained thereby.

Variations may be made in materials, proportions, and procedures without departing from the scope of this invention.

I claim:

1. A process for preparing esters of a starch having free reactive hydroxyl groups comprising the steps of:
    a. reacting said starch with an imidazolide-acid reaction product selected from the group consisting of

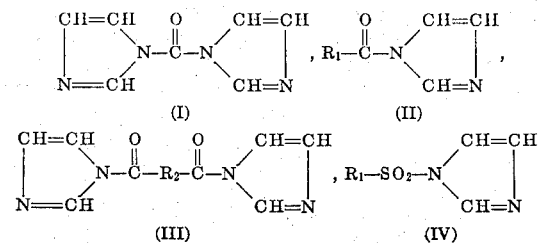

and triimidazolides of tricarboxylic acids, wherein $R_1$ is selected from the group consisting of alkyl, substituted alkyl, unsaturated alkyl, cycloalkyl, aryl, substituted aryl and arylalkyl; $R_2$ is selected from the group consisting of alkylene, substituted alkylene, bis-alkylene ether, cycloalkylene, arylene and substituted arylene; and $R_1$ and $R_2$ each contain from one to 20 carbon atoms;
the amount of said imidazolide reagent reacted with said starch being from 0.05 to 100 percent, based on the weight of the dry starch; and
    b. isolating the resultant starch derivative.

2. A process according to claim 1 wherein said starch is reacted with said imidazolide in an aqueous medium at a pH of from about 4.0 to about 12.5 and at a temperature of about 35° to 125° F. for a period of from 1 to 24 hours.

3. A process according to claim 1 wherein the reaction is carried out in a non-aqueous liquid medium at a temperature of about 35° to 125° F. for a period of from 1 to 24 hours.

4. A process according to claim 1 wherein the reaction is carried out employing a substantially dry reaction medium at a temperature of about 80° to 160° F. for a period of from 0.5 to 6 hours.

5. A process according to claim 1 wherein said starch is corn starch.

6. A process according to claim 1 wherein said starch is waxy maize.

7. A process according to claim 1 wherein the starch is reacted with 1,1'-carbonyldiimidazole.

8. A process according to claim 1 wherein the starch is reacted with the diimidazolide of succinic acid.

9. A process according to claim 1 wherein the starch is reacted with a diimidazolide of adipic acid.

* * * * *